UNITED STATES PATENT OFFICE.

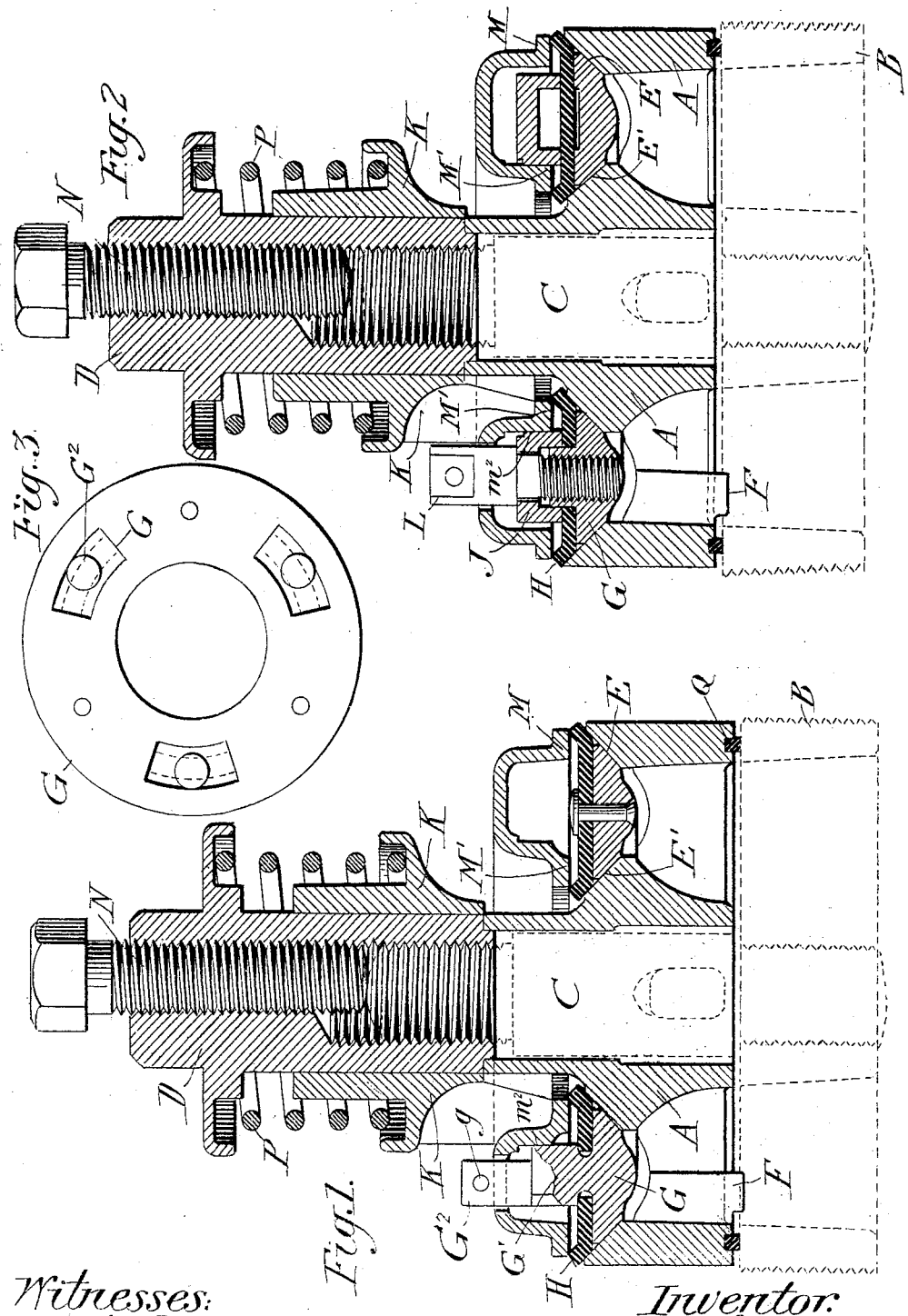

HENRY GABRIEL GINACA, OF HONOLULU, TERRITORY OF HAWAII, ASSIGNOR OF TWO-FIFTHS TO HANS O. C. ISENBERG, OF HONOLULU, TERRITORY OF HAWAII.

VALVE.

No. 805,850.  Specification of Letters Patent.  Patented Nov. 28, 1905.

Application filed October 18, 1904. Serial No. 228,966.

*To all whom it may concern:*

Be it known that I, HENRY GABRIEL GINACA, a citizen of the United States of America, residing at Honolulu, Island of Oahu, Territory of Hawaii, have invented new and useful Improvements in Valves, of which the following is a specification.

My invention relates to improvements in pump-valves, particularly high-pressure valves, the object of my improvements being to simplify the construction, so as to lower the cost of manufacture, at the same time retaining the salient features and efficient operation of the type of valve described and claimed in Letters Patent No. 768,042, issued August 23, 1904, to H. O. C. Isenberg and myself as joint inventors.

Referring to the accompanying drawings, Figure 1 represents a sectional elevation of a complete valve embodying my improvements as applied to existing casing and stem of a rubber-disk valve. Fig. 2 represents a similar view of a modification, and Fig. 3 is a top plan view of the valve-piece shown in Fig. 1.

Similar letters of reference indicate similar parts in the views.

Referring to Fig. 1, A indicates the valve-casing surrounding the stem C and jammed against the ring B of an ordinary rubber-disk valve by the nut D, the ears F preventing the casing A from turning about the stem C. Valve-seats E and E' are formed in the casing A, as shown. The valve G is beveled on its under side to suit the seats E and E' and has on its upper surface the projections G', terminating in the teats $G^2$. An inner and outer groove is turned in the projections G' at their outer junction with the upper surface of the valve G to hold the washer H, which is sprung into place and riveted to the valve G between the projections G'. The washer H is made of flexible material—such as leather, for example—and is cut wider than the valve G, so as to extend over and make joints with the seats E and E'. Above the valve G is the piece K, capable of sliding vertically on the cylindrical portion of the nut D and terminating at its lower end in two concentric rings M and M' over the flexible parts of the valve. The sleeve portion of the piece K has a projecting flange with a circular recess, between which and a similar flange on the nut D is interposed the spring P, this construction permitting of a longer spring than heretofore. The lower portion of the piece K near its inner ring M' is turned to provide the surface $m^2$ inside of the projections G', so as to center and guide the valve G, and the teats $G^2$ project through openings in that portion of the piece K connecting its rings M and M' and have pins $g$ or their equivalent in their upper ends to limit the downward motion of the valve G with respect to the piece K. A set-screw N, preferably placed eccentrically in the nut D and jammed against the end of the stud C, prevents the nut D from turning after the casing A has been jammed against the ring B. A groove turned in the bottom of the casing A for a small ring of suitable packing Q makes a tight joint.

Referring to Fig. 2, it will be noted that the construction is similar, with the exception of that of the valve proper. The bolts L clamp the cap J and washer H to the valve G, the head of the bolts L projecting through the piece K to receive split pins. The cap J is turned to fit outside of the inner ring M' of the piece K for the purpose of guiding the valve.

In operation the valve in rising by the action of the fluid is guided by the projections G' in Fig. 1 or by the cap J in Fig. 2, sliding on the turned portion of the piece K near one of its rings M'. As the valve G rises the flexible washer H leaves the bevel of the seats E and E' and straightens out against the bottom of the rings M and M'. The valve continuing upward, then pushes the piece K, sliding on the nut D, compressing the spring P, its upward lift being limited by the top of the piece K striking the flange of the nut D. Upon reversal the valve and the piece K lowers, being pressed downward by the action of the spring P against the flow of the fluid until the flexible washer H touches the valve-seats E and E', with the rings M and M' pressing on the flexible parts of the valve, forming at once water-tight joints, whereupon the valve in lowering independent of the piece K is guided, as above stated, and the flexible washer readjusts itself to the bevel of the valve-seats as the valve G becomes seated.

It will be noted that I have greatly simplified the construction shown in the patent above referred to by combining in the one piece K the sleeve, the spring-ring, and the concentric spider-rings and, further, by omitting the spider fingers and the sleeve-lugs and the bolts which held the four valve parts together, all of which has materially lowered the cost of manufacture, while the salient features and efficient operation of the valve have been retained.

Having thus described my invention, what I claim, and desire to secure by Letters Patent of the United States, is—

1. The combination with a ring B having a central stem C, of a valve-casing A surrounding said stem and having inner and outer valve-seats E' and E, a nut D having a flange and engaging with said stem to clamp said casing to said ring, a valve G adapted to be seated upon said seats and having integral lugs G', a flexible washer H above said valve, a piece K having at its lower end, concentric rings M and M' with plane lower surfaces above and adapted to engage with the edges of said washer, said piece K also having a flange and a guide-surface $m^2$ against which the lugs G' bear, a spring interposed between the flange on said nut and the flange on said piece K, and means for limiting the downward movement of said valve with respect to the piece K.

2. The combination with a ring B having a central stem C, of a valve-casing A surrounding said stem and having inner and outer valve-seats E' and E, a nut D having a flange and engaging with said stem to clamp said casing to said ring, a valve G having a groove adapted to be seated upon said seats and having integral lugs G', a flexible washer H held in said groove by its resilience above said valve, a piece K having at its lower end, concentric rings M and M' with plane lower surfaces above and adapted to engage with the edges of said washer, said piece K also having a flange and a guide-surface $m^2$ against which the lugs G' bear and a spring interposed between the flange on said nut and the flange on said piece K.

3. The combination with a ring B having a fixed central stem C of a valve-casing A surrounding said stem and having valve-seats E' and E, a valve G adapted to be seated upon said seats, a nut D having a flange and adapted to engage with said stem to clamp said casing to said ring, a set-screw carried by said nut and bearing eccentrically upon the end of said stem, and a spring interposed between said flange and valve.

4. The combination with a ring B having a central stem C, of a valve-casing A surrounding said stem and having inner and outer valve-seats E' and E, a nut D having a flange and engaging with said stem to clamp said casing to said ring, a valve G adapted to be seated upon said seats and having integral lugs G' and teats $G^2$, a flexible washer H above said valve, a piece K having at its lower end, concentric rings M and M' with plane lower surfaces above and adapted to engage with the edges of said washer, said piece K also having a flange and a guide-surface $m^2$ against which the lugs G' bear, a spring interposed between the flange on said nut and the flange on said piece K, said teats extending through openings in said piece K, and means secured to the upper ends of said teats adapted to prevent their withdrawal from said openings.

In testimony whereof I have signed my name to this specification in the presence of two subscribing witnesses.

HENRY GABRIEL GINACA.

Witnesses:
 CHAS. R. ROE,
 ROBT. J. PRATT.